Aug. 10, 1948.    J. B. BRENNAN    2,446,524
ELECTRODES AND METHODS OF MAKING SAME
Filed Nov. 14, 1941    2 Sheets-Sheet 1
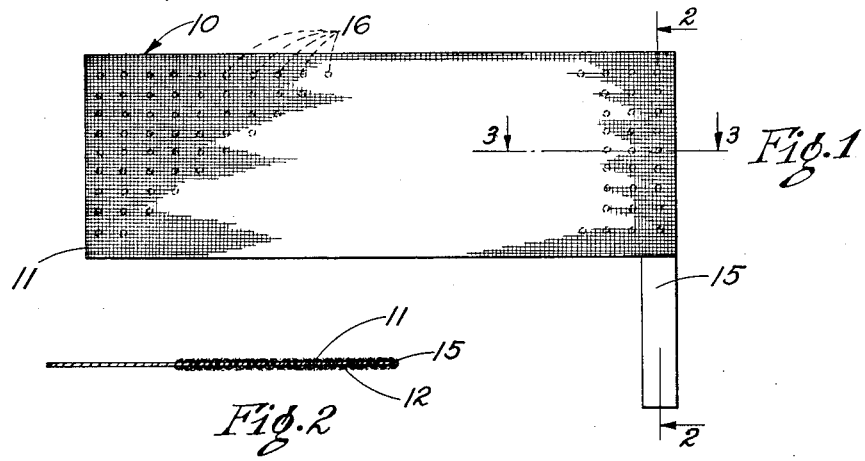
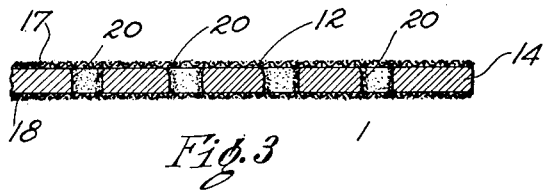
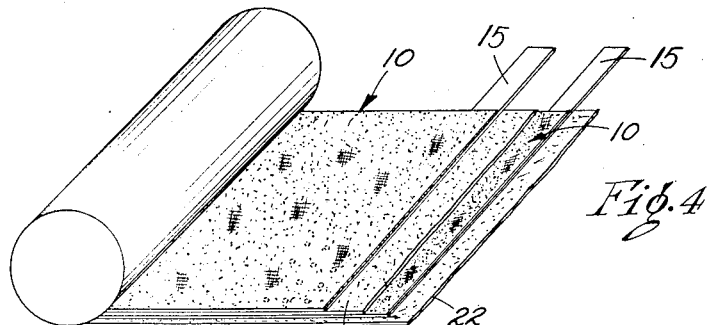
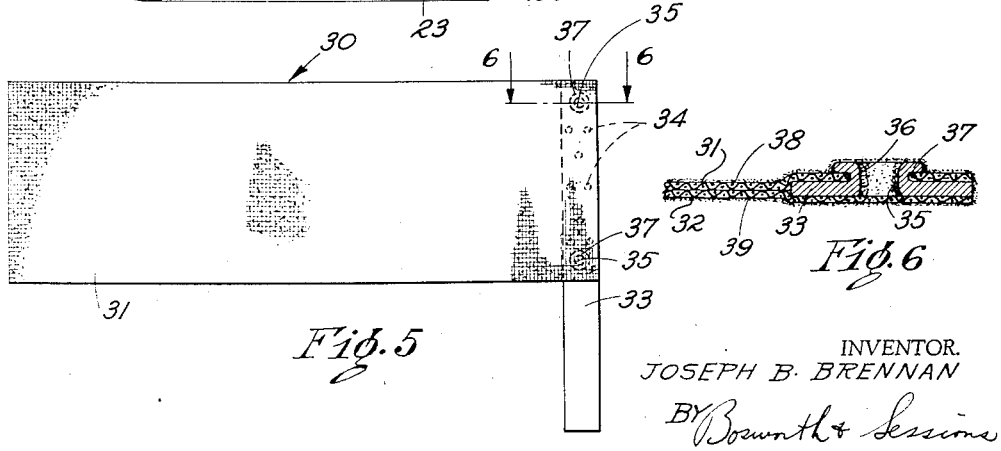
INVENTOR.
JOSEPH B. BRENNAN
BY Bosworth & Sessions
ATTORNEYS Aug. 10, 1948.    J. B. BRENNAN    2,446,524
ELECTRODES AND METHODS OF MAKING SAME
Filed Nov. 14, 1941    2 Sheets-Sheet 2

INVENTOR.
JOSEPH B. BRENNAN
BY Bosworth + Sessions
ATTORNEYS

Patented Aug. 10, 1948

2,446,524

UNITED STATES PATENT OFFICE 2,446,524

ELECTRODE AND METHOD OF MAKING SAME

Joseph B. Brennan, Euclid, Ohio, assignor to Everett D. McCurdy, as trustee

Application November 14, 1941, Serial No. 419,157

7 Claims. (Cl. 175—315)

This invention relates to electrodes for electrolytic devices and particularly to electrode and terminal constructions for electrolytic condensers and other similar devices embodying electrodes having active surfaces of spray deposited metal. Insofar as common subject matter is concerned, this application is a continuation in part of my copending application Serial No. 158,105, filed August 9, 1937, now Patent No. 2,280,789, issued April 28, 1942.

One of the objects of my invention is to provide electrodes embodying sprayed metal surfaces having high capacity per unit of mass, low resistance, and ample mechanical strength. Another object is to provide a terminal and electrode assembly for such electrodes giving a strong mechanical bond and an electrical connection which will retain its high conductivity over long periods of time. Another object is to provide economical methods of making such electrodes and assemblies. Further objects and advantages of my invention will become apparent from the following description of preferred forms thereof, reference being made to the accompanying drawings. The essential characteristics are summarized in the claims.

Figure 7:
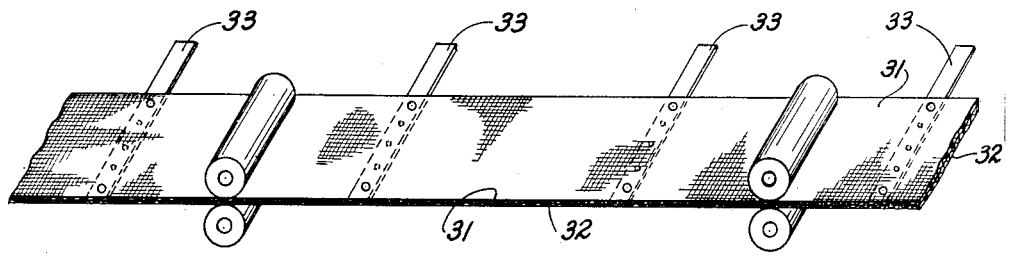
Figure 8:
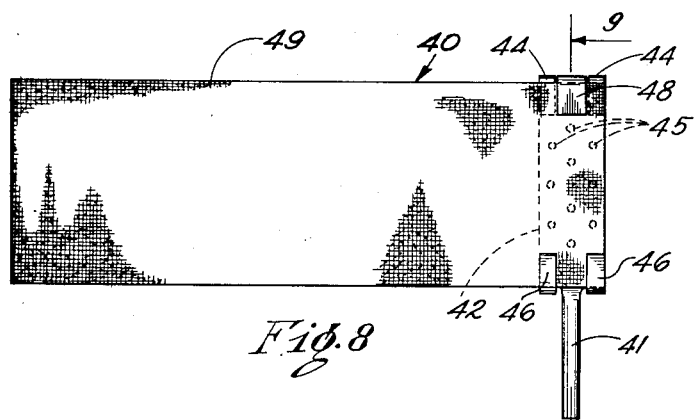
Figure 9:
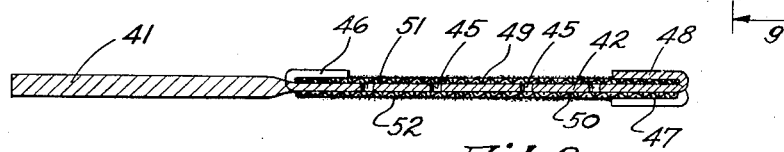
Figure 10:
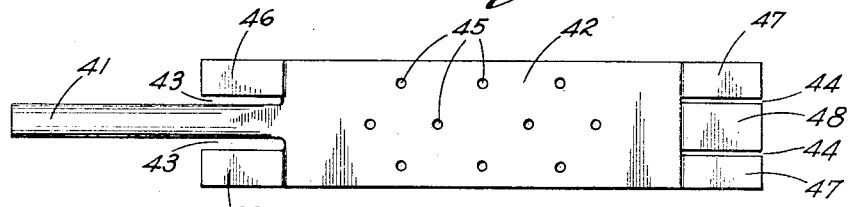

In the drawings, Fig. 1 is a plan view of one type of electrode embodying a preferred form of my invention; Fig. 2 is a section as indicated by the line 2—2 of Fig. 1; Fig. 3 is a fragmentary section on an enlarged scale as indicated by the line 3—3 of Fig. 1; Fig. 4 illustrates one type of condenser embodying electrodes made according to my invention, parts being broken away for convenience of illustration; Fig. 5 is a plan view of an electrode embodying another form of my invention; Fig. 6 is a section on an enlarged scale taken along the line 6—6 of Fig. 5; Fig. 7 illustrates one step in the manufacture of the electrode shown in Fig. 5; Fig. 8 is a plan view of another form of my invention; Fig. 9 is a section on an enlarged scale indicated by the line 9—9 of Fig. 8; and Fig. 10 is a plan view of the terminal member of Figs. 8 and 9 before assembly with the electrode.

My invention in its preferred form is particularly applicable to electrodes comprising strips of flexible, porous material having spray deposited conductive layers thereon, such electrodes being described and claimed in my application Serial No. 158,105 aforesaid. According to the present invention, I employ in conjunction with such electrodes additional conductive members either in the form of terminal members, or sheets or strips extending along the electrodes, or both, these members preferably being composed of thin metal sheets or strips perforated with openings of such size in relation to the thickness of the foil that the diameters of the openings are several times the thickness of the foil, and the members being mechanically secured and electrically connected to the porous flexible material by the spray deposited layers which constitute the active material of the electrodes.

The bonding of auxiliary conductors or terminal members to an electrode having a base of flexible, porous material is described and claimed in my aforesaid application; however, according to the present invention the connection between the auxiliary members and the remaining portion of the electrode is improved by the perforations through which the spray deposited material penetrates and, further, by employing perforated metallic members a metallic member of substantially the same dimensions as the completed electrode may be positioned between two layers of cloth or gauze or other porous fibrous material without impairing the efficiency of the electrode, for the perforations provide for the necessary circulation of electrolyte and flow of ions when the electrode is incorporated in an electrolytic device.

As noted above, the perforated member is preferably disposed between two layers of porous base material such as open mesh cloth or gauze and the spraying operation is carried out from both sides. Thus the spray deposited material not only binds the cloth or gauze to the metal member but penetrates through the perforations in the metal member and binds the two strips of cloth or gauze together through the perforations. This provides a key which prevents displacement of the metal member with respect to the cloth strips under all ordinary conditions of operation. As will be described in greater detail below, my invention also contemplates the securing of the metal members, particularly when such members merely function as the electrode terminals, to the base members by clinching or riveting thereto prior to the spraying operation.

Referring in detail to the drawings, Figs. 1 to 3 illustrate a preferred form of my electrode indicated generally at 10 and comprising two strips 11 and 12, of flexible porous material such as open mesh cloth or gauze, glass cloth, perforated paper, perforated asbestos, or the like, the strips being shown in the drawings as composed of gauze. A metallic member 14 is disposed between the two gauze strips and is substantially co-extensive with the gauze strips except for the terminal portion 15 which extends beyond one edge of the strips to provide for connecting the completed electrode to an external circuit. The member 14 has a plurality of perforations 16 distributed over the surface thereof and the two cloth strips with the member 14 positioned between them as shown, are sprayed on both sides with finely divided molten metal, aluminum preferably being employed when the electrode is to be incorporated in an electrolytic condenser, and the member 14 preferably being composed of the same metal as the sprayed layers.

This produces the construction shown diagrammatically in Fig. 3 wherein the spray deposited layers 17 and 18 permeate the cloth strips and impinge against the member 14. The particles also are projected into and through the openings 16 in the member 14 as indicated diagrammatically at 20, thus forming a connection through the member between the spray deposited layers 17 and 18 connecting the two base strips at this point. The spray deposited particles at 20 extending through the perforations and anchored to both of the base strips strongly hold the terminal member in position against displacement. In addition, the spray deposited particles, being welded to each other and to the surfaces of the member 14, insure a low resistance path for electricity to flow between the terminal 15 and all points of layers 17 and 18. By reason of the welded connections aforesaid the electrical circuits are protected against the possibility of the formation of dielectric films between the particles, which would increase the resistance of the connection between the terminal and the spray deposited layers.

In carrying out the spraying operation, well-known forms of apparatus may be employed and the procedure generally outlined in my Patent No. 2,104,018 may be followed. More specifically, the operation may be carried out as described in my parent application Serial No. 158,105 aforesaid, the spray deposited layers being of sufficient thickness and continuity to insure their being conductive and of low resistance, and to insure the production of a proper electrical and mechanical bond between the terminal and the electrode. However, the layers are preferably not thick enough to destroy the porosity of the electrode assembly, or to impair its flexibility sufficiently to prevent the electrode from being rolled or otherwise formed into the desired shape for incorporation in condensers.

Electrodes made acccording to my invention may be incorporated into electrolytic devices of various types such as the paste type of electrolytic condenser illustrated in Fig. 4 and comprising a pair of electrodes 10 having terminal members 15 and separated by paper or gauze spacers 22 and 23, the whole assembly being impregnated with a suitable film maintaining electrolyte of the viscous or paste type, rolled into substantially cylindrical form as shown and enclosed in a suitable casing (not shown). In such a condenser the sprayed layers and inner metal member of the anode at least will be composed of aluminum or other film forming metal and provided with a dielectric film formed thereon electrolytically in any manner known to those skilled in the art, such as the method briefly described in my Patent No. 2,104,018. The other electrode or cathode need not be provided with a dielectric film if the condenser is intended for direct current service an in that case the cathode need not be of film forming metal as any metal which will not contaminate the electrolyte may be employed. Copper may be used, for example. If the condenser is intended for alternating current service, then both electrodes are made of film forming metal such as aluminum and both are provided with dielectric films.

In Figs. 5 and 6 I have illustrated a modified form of electrode wherein the electrode, indicated generally at 30, may be composed of two cloth strips 31 and 32 corresponding in general to the strips 11 and 12. In this modification, the terminal member 33 is provided with perforations 34 which correspond in general to the perforations 16 in the previous modification. However, in this instance the member 33 is not coextensive with the cloth strips, and is provided with openings 35 surrounded by drawn or extruded projections 36 which act in the manner of eyelets and are clinched over as at 37 to secure the member 33 to the strip 31. In commercial production I contemplate that the operation of clinching the member 33 to the strip 31 will be carried out before the spraying of the strip and before the strip is cut to length to form the completed electrode. Thus, as shown in Fig. 7, a plurality of members 33 may be clinched to a long strip, then the strip 31 is positioned in face to face contact with the strip 32 with the members 33 between the strips, the strips being guided by suitable rollers or other guides. The assembly may then be subjected to a continuous spraying operation by passing it between suitable spray guns directed toward opposite sides thereof, thus producing the spray deposited layers 38 and 39, the spray deposited particles penetrating the openings 34 and 35 and bonding the strips to the terminal and each other. Thereafter, the electhode strip, if intended for condenser anodes, may be subjected to a forming operation and cut into lengths, each length having a terminal member bonded thereto by the spray deposited material as well as by the clinching operation. The lengths may be incorporated in electrolytic condensers or other devices as before.

In Figs. 8, 9 and 10 I have illustrated a further modification of my invention wherein the electrode 40 may be similar in all material respects to the electrode 30 of Fig. 5 except for the terminal construction. In this modification the terminal 41 comprises a rod as shown in Fig. 10 having a flattened portion 42 which is slotted as at 43 and 44 at the ends of the flattened portion and which is provided with a plurality of perforations 45. The slots 43 form ears or tongues 46 while the slots 44 form outer tongues 47 and an inner tongue 48 on the opposite end of the flattened portion.

In this type of construction the terminal member is assembled with the two cloth strips 49 and 50 making up the electrode in the manner heretofore described. The terminal is secured to the strips prior to the spraying operation as indicated particularly in Fig. 9, the tongues 46 being bent over and into clinching engagement with the strip 49 at one end of the flattened portion 42 of the terminal member. The central tongue 48 at the opposite end is also bent over and clinched into engagement with the strip 49, and the outer tongues 47 are bent downwardly as shown in the drawing and into engagement with the strip 50. As described heretofore, these terminal members may be secured at spaced intervals to long strips of cloth and thereafter the cloth may be subjected to a spraying operation, finely divided molten metal preferably being projected against both sides of the assembly producing the sprayed layers 51 and 52, the sprayed particles penetrating the openings 45 and bonding the strips together as before. As in the previous modifications, if the electrodes are intended for use in electrolytic condensers, aluminum is preferably employed in the spraying operation and the terminal member is composed of the same metal. The strip may be subjected to the usual film forming operation and may be severed into suitable lengths for incorporation in condensers or other electrolytic devices either before or after the film forming operation.

It will be evident that my invention provides electrodes especially adapted for electrolytic condensers and similar devices in which additional conductive members are incorporated and bonded to a non-conductive base material on which the spray deposited layers are produced. By reason of the perforations, the metallic members are not only bonded to the non-metallic strips by the adhesion of the metallic particles to the non-metallic strips but are also keyed thereto by the particles penetrating the perforated openings in the strips. Further, the perforations assist in maintaining the efficiency of the electrodes by permitting proper circulation of electrolyte and flow of ions. The terminal construction insures a low resistance path for the flow of current from an external circuit to the electrode, and the spray deposited particles not only firmly bond the terminals mechanically to the electrode but also provide a highly efficient electrical connection which will maintain its high conductivity over long periods of time as the spray deposited particles impinge upon the terminal members with such force as to provide a sealed connection which prevents the formation of a dielectric film between the terminal member and the electrode.

Those skilled in the art will appreciate that various changes and modifications may be made in the preferred forms disclosed herein without departing from the spirit and scope of my invention. For example, the elements disclosed in the forms shown herein may be combined in different manners. Thus the sheet 15 of Figs. 1 to 3 may be secured to the strips 12 and 14 by eyelets such as those shown in Figs. 6 and 7 or by tongues such as those shown in Figs. 8, 9 and 10. Also, the strip or member 15 need not be of the same area as the strips 12 and 14, and if desired separately formed terminal members may be employed with strips extending along the completed electrodes. Further, it is contemplated that the terminal members may be secured to the cloth strips solely by the spraying with the sprayed material penetrating perforations in the terminal member. It is also contemplated that only a single layer of cloth may be employed or more than two layers of cloth may be employed, depending upon the requirements for which the electrode is designed. Various other changes and modifications in the preferred forms disclosed herein both as to the article and the method will be apparent to persons skilled in the art and it is accordingly to be understood that my invention is not limited by the foregoing description or in any manner other than by the scope of the appended claims.

I claim:

1. An electrode for electrolytic condensers comprising at least two layers of fibrous flexible material disposed in direct face-to-face contact throughout substantially the entire effective electrode area and a multiplicity of particles of film-forming metal adhering to the fibers of said layers and an additional metallic conductor between said layers and in electrical contact with the particles of film-forming metal.

2. An electrode for electrolytic condensers comprising at least two layers of fibrous flexible material disposed in direct face-to-face contact throughout substantially the entire effective electrode area and a multiplicity of particles of film-forming metal adhering to the fibres of said layers and bonding said layers together.

3. An electrode for electrolytic condensers comprising two open mesh cloth layers disposed in direct face-to-face contact throughout substantially the entire effective electrode area and a spray-deposit of aluminum adhering to the fibres of said layers and bonding said layers together.

4. An electrode for electrolytic condensers comprising two cloth layers disposed in direct face-to-face contact throughout substantially the entire effective electrode area and a multiplicity of particles of aluminum adhering to the fibres of said layers and an additional aluminum conductor between said layers, said particles also adhering to said conductor.

5. An electrode for electrolytic condensers comprising two open-mesh cloth layers disposed in direct face-to-face contact throughout substantially the entire effective electrode area and a spray-deposit of aluminum adhering to the fibres of said layers and bonding said layers together, and an aluminum foil strip of lesser area than said cloth layers between said layers and bonded thereto by said spray-deposit.

6. An electrode for electrolytic condensers comprising at least two layers of sheet flexible material disposed in direct face-to-face contact throughout substantially the entire effective electrode area, at least one of said layers being perforate, and at least one of said layers being fibrous, and a multiplicity of particles of film-forming metal adhering to said layers and bonding said layers together.

7. An electrode for electrolytic condensers comprising two cloth layers disposed in direct face-to-face contact throughout substantially the entire effective electrode area and a multiplicity of particles of aluminum adhering to the fibres of said layers and an additional aluminum conductor between said layers, said particles also adhering to said conductor, said conductor having a portion projecting beyond an edge of said cloth layers and constituting a terminal for said electrode.

JOSEPH B. BRENNAN.

REFERENCES CITED

The following references are of record in the file of this patent:

UNITED STATES PATENTS

| Number | Name | Date |
|---|---|---|
| 1,829,015 | Reiher | Oct. 27, 1931 |
| 2,104,018 | Brennan | Jan. 4, 1938 |
| 2,128,990 | Dubilier | Sept. 6, 1938 |
| 2,172,604 | Blackburn | Sept. 12, 1939 |
| 2,218,162 | Brock | Oct. 14, 1940 |
| 2,251,913 | Brennan | Aug. 12, 1941 |
| 2,280,789 | Brennan | Apr. 28, 1942 |
| 2,297,607 | Blackburn | Sept. 29, 1942 |
| 2,375,211 | Brennan | May 8, 1945 |

FOREIGN PATENTS

| Number | Country | Date |
|---|---|---|
| 503,370 | Great Britain | Apr. 5, 1939 |
| 504,452 | Great Britain | Apr. 25, 1937 |
| 521,963 | Great Britain | June 5, 1940 |